United States Patent
Haldemann

(10) Patent No.: US 9,698,640 B2
(45) Date of Patent: Jul. 4, 2017

(54) STATOR WINDING OF A DIRECTLY COOLED TURBOGENERATOR

(71) Applicant: ALSTOM Technology Ltd, Baden (CH)

(72) Inventor: Johann Haldemann, Birr (CH)

(73) Assignee: General Electric Technology GmbH, Baden (CH)

( * ) Notice: Subject to any disclaimer, the term of this patent is extended or adjusted under 35 U.S.C. 154(b) by 158 days.

(21) Appl. No.: 14/102,697

(22) Filed: Dec. 11, 2013

(65) Prior Publication Data

US 2014/0159518 A1    Jun. 12, 2014

(30) Foreign Application Priority Data

Dec. 11, 2012   (EP) ..................... 12196540

(51) Int. Cl.
*H02K 3/24* (2006.01)
*H02K 3/14* (2006.01)

(52) U.S. Cl.
CPC ............. *H02K 3/24* (2013.01); *H02K 3/14* (2013.01)

(58) Field of Classification Search
CPC .................................. H02K 3/14; H02K 3/24
USPC ......................................................... 310/59
See application file for complete search history.

(56) References Cited

U.S. PATENT DOCUMENTS

| | | | | |
|---|---|---|---|---|
| 1,144,252 A | * | 6/1915 | Roebel ..................... | H02K 3/14 174/129 S |
| 3,647,932 A | | 3/1972 | Heller et al. | |
| 4,959,575 A | * | 9/1990 | Saitoh ..................... | H02K 3/14 174/34 |
| 5,270,598 A | * | 12/1993 | Holly, III ............... | H02K 3/24 310/208 |
| 5,323,079 A | | 6/1994 | Nieves et al. | |
| 5,777,417 A | * | 7/1998 | Haldemann ............ | H02K 3/14 174/33 |
| 7,459,825 B2 | * | 12/2008 | Haldemann ............ | H02K 3/14 174/33 |
| 2005/0116573 A1 | * | 6/2005 | Hattori .................. | H02K 3/24 310/213 |
| 2007/0222321 A1 | * | 9/2007 | Haldemann ............ | H02K 3/14 310/213 |

FOREIGN PATENT DOCUMENTS

| | | |
|---|---|---|
| DE | 197 54 943 | 6/1999 |
| DE | 100 59 385 | 6/2002 |
| EP | 2 262 079 | 12/2010 |
| GB | 934434 | 8/1963 |
| WO | 2012/113853 | 8/2012 |

* cited by examiner

*Primary Examiner* — Alex W Mok
(74) *Attorney, Agent, or Firm* — GE Global Patent Operation; Rita D. Vacca

(57) ABSTRACT

A stator winding of a directly cooled turbogenerator comprises directly gas cooled double Roebel bars is arranged as active parts in slots of a stator body. Each double Roebel bar has two single Roebel bars, which includes each a stack of a plurality of transposed individual strands, and are separated by an intermediate stack of cooling tubes. Mounting space is saved by constructing, for the compensation of stray field voltages, at least one double Roebel bar as a cross-over bar with the strands being transposed over the stack of cooling tubes in the middle in order to change the sides of the single Roebel bars along the active part.

12 Claims, 6 Drawing Sheets

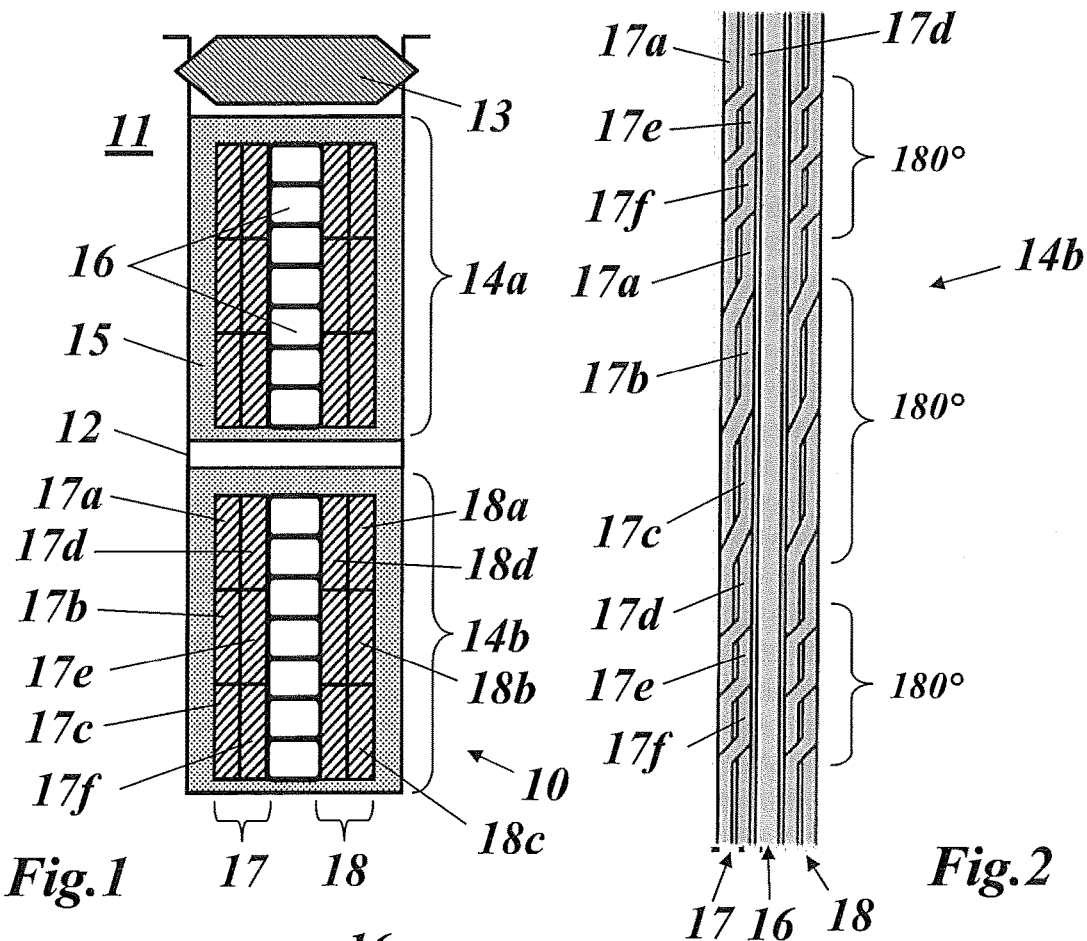
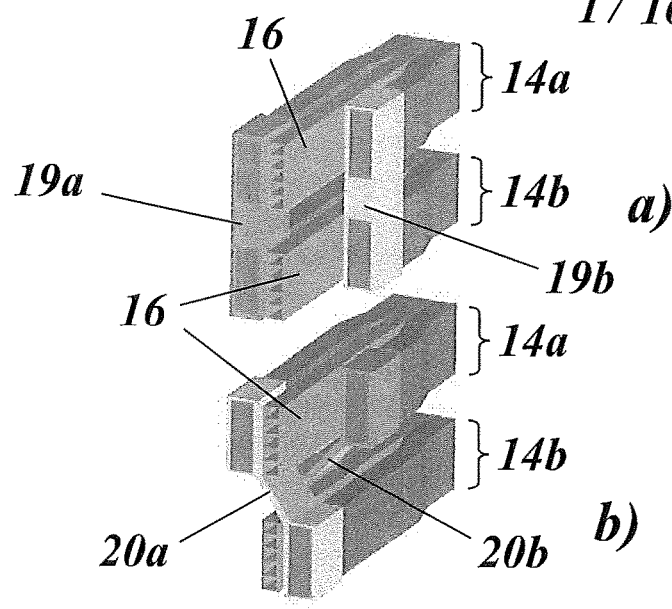
Fig.1  Fig.2  Fig.3

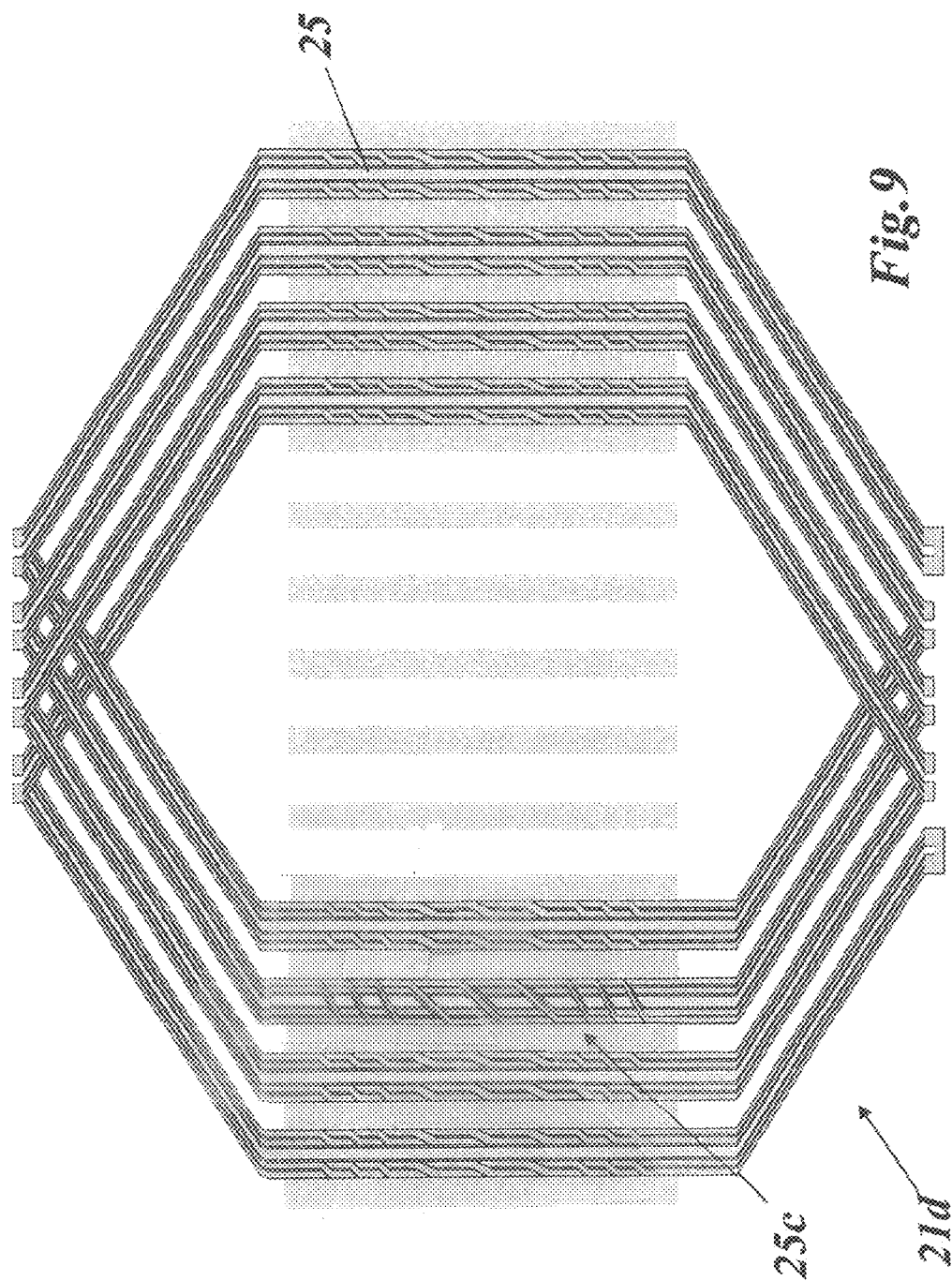

STATOR WINDING OF A DIRECTLY COOLED TURBOGENERATOR

CROSS-REFERENCE TO RELATED APPLICATIONS

This application claims priority to European application 12196540.4 filed Dec. 11, 2012, the contents of which are hereby incorporated in its entirety.

TECHNICAL FIELD

The present invention relates to the technology of rotating electric machines such as turbogenerators, hydro generators or electric motors. It refers to a stator winding of a directly cooled electric machine according to the preamble of claim 1.

BACKGROUND

Roebel bars in the active parts of the stator winding of a turbogenerator are well-known in the art (see the documents cited below).

Directly gas (hydrogen) cooled Roebel bars of turbogenerator stator windings consist of two or four stacks of individual strands. Between them non-transposed cooling tubes are located. In single Roebel bars the cooling tube stack is located between the two stacks of strands. This is as well the case of a double Roebel bar with a cooling tube stack in the middle of each single bar (in the total bar there are two cooling tube stacks, see document DE 100 59 385 A1 FIG. 1 a). These arrangements need a transposition of the strands crossing the cooling tube stack. At bar ends the individual strands or bundles of them are connected to the next bar by "transposing" the strands additionally.

In the case of having a double Roebel bar consisting of two single Roebel bars and a single cooling tube stack between them the strands of the single Roebel bars are transposed internally without crossing the cooling tube stack. FIG. 1 shows the cross section of a stator winding 10 with such double Roebel bars 14a and 14b. Each double Roebel bar 14a,b comprises two single Roebel bars 17 and 18, with a stack of cooling tubes 16 disposed between them. The double Roebel bars 14a,b are each surrounded by an insulation 15 and arranged within a slot 12 of the stator body 11. A wedge 13 keeps the bars in the slot 12.

FIG. 2 shows the top view on the bar 14b. Each single Roebel bar 17, 18 comprises (in this simplified example) two parallel stacks of individual strands 17a-c, 17d-f and 18a-c, 18d-f. Within each of the single Roebel bars 17, 18 the respective strands 17a-f and 18a-f are internally transposed with no crossing of the stack of cooling tubes 16. The transpositions are done in series of three 180°-transpositions, so that a total (added) Roebelisation angle of 540° is achieved.

At bar ends the individual strands (or bundles of them) are again connected to the next bar by "transposing" the strands additionally.

At bar ends it is possible to put one massive lug per single bar. In total there are two lugs per bar end, see FIG. 3a, where normal massive double lugs 19a and 19b are provided to connect the single Roebel bars of double Roebel bars 14a and 14b.

In the middle of a phase group a crossing lug has to be foreseen to compensate for the stray field voltages which are collected along the two parallel paths which are formed by the single bars of all the double Roebel bars, see FIG. 3b, where two crossing double lugs 20a and 20b are provided to connect the single Roebel bars of double Roebel bars 14a and 14b crosswise.

Document DE 100 59 385 A1 discloses a device, which has sub-conductors divided into 4 adjacent stacks and 2 rows of cooling lines, each between both inner sub-conductor stacks and one of the outer stacks. Both inner stacks form a core rod in which only the sub-conductors of the two inner stacks are twisted together. The two outer stacks form a hollow rod in which only the sub-conductors of the two outer stacks are twisted together and the cooling lines pass through without pinch points. The device has a number of sub-conductors divided into four adjacent stacks and two rows of cooling lines, each between both inner sub-conductor stacks and one of the outer stacks. Both inner stacks form a core rod in which only the sub-conductors of the two inner stacks are twisted together. The two outer stacks form a hollow rod in which only the sub-conductors of the two outer stacks are twisted together and the cooling lines pass through without pinch points. Independent claims are also included for the following: a method of manufacturing a dual twisted rod.

Document DE 197 54 943 A1 discloses a winding for the stator of an electrical machine comprises an electrical conductor which forms the part of the winding stipulated for insertion into a slot in the stator with its end sections. The conductor is formed out of a number of subconductors located in four adjacent stacks. The stacks have the same number of subconductors which are twisted together over the length of the conductor. Each two adjacent subconductors are twisted. The twisted subconductors are bent together at one or more places over the length of the conductor so that the previously inside-lying subconductor behind the bend point lies outside and the previous outside-lying conductor behind the bend point lies inside. The subconductors are also, or instead, bent in crosswise fashion at one or more places over the length of the conductor so that the previously inside-lying subconductor behind the bend point also lies inside and the previously outside-lying subconductor behind the bend point also lies outside.

Document EP 2 262 079 A1 discloses a stator bar, which comprises four stacks of strands defining an active part wherein the strands are transposed by successive crossovers from one stack position to another, and two end windings extending from the two ends of the active part. The strands of the active part are transposed by 360° or 540° such that all strands occupy all positions in the bar for substantially equal distances. In addition, the end windings are transposed by successive crossovers from one stack position to another by an angle between 60-180°.

Document U.S. Pat. No. 3,647,932 discloses a transposed stranded conductor for dynamoelectric machines having four stacks of strands transposed in the slot portion of the conductor in such a manner that each stack moves to different transverse positions in successive longitudinal sections of the bar such that the stacks are reversed in transverse position at opposite ends of the bar. Preferably, the strands are also transposed in a manner to cause inversion of the relative strand positions at opposite ends of the slot so that the conductor is fully transposed with inversion of strand position both transversely of the slot and depthwise of the slot.

While certain Roebelisations are known for indirectly cooled Roebel bars and directly water cooled Roebel bars (where the cooling conductors are transposed as well as the massive strands), see the already mentioned documents U.S. Pat. No. 3,647,932 and DE 197 54 943 A1, above, no such Roebelisations are known for directly gas cooled Roebel bars (with non-transposed cooling tube stacks put in the bars) comprising double Roebel bars.

The known solution for the Roebel bar design with massive lugs including crossing lugs or similar, as shown in FIG. 3, requires a substantial amount of space, especially when crossing lugs are involved.

It would therefore be advantageous, especially for retrofit applications, to have a Roebelisation design, which requires less space.

SUMMARY

It is an object of the present invention to disclose a stator winding of a directly cooled turbogenerator, which comprises directly gas cooled double Roebel bars being arranged as active parts in slots of a stator body, each double Roebel bar having two single Roebel bars, which are separated by an intermediate stack of cooling tubes, and which requires less space for the Roebelisation design.

This and other objects are obtained by a stator winding according to claim 1.

The stator winding of a directly cooled turbogenerator according to the invention comprises directly gas cooled double Roebel bars being arranged as active parts in slots of a stator body, each double Roebel bar having two single Roebel bars, which comprise each a stack of a plurality of transposed individual strands and are separated by an intermediate stack of cooling tubes.

It is characterized in that for the compensation of stray field voltages at least one double Roebel bar is constructed as a cross-over bar with the strands being transposed over the stack of cooling tubes in the middle in order to change the sides of the single Roebel bars along the active part.

According to an embodiment of the invention a plurality of cross-over bars is provided.

According to another embodiment of the invention at the at least one cross-over bar the uppermost and lowermost strands, respectively, of the stacks are transposed together.

Specifically, the total Roebelisation angle in the active part of the at least one cross-over bar is 540°.

More specifically, the total Roebelisation angle is achieved by a sequence of three transpositions of 180° each.

According to a further embodiment of the invention all transpositions cross the intermediate stack of cooling tubes either in parallel and/or crosswise.

According to another embodiment of the invention all transpositions cross the intermediate stack of cooling tubes in parallel.

According to just another embodiment of the invention all transpositions cross the intermediate stack of cooling tubes crosswise.

According to a further embodiment of the invention of the sequence of three 180°-transpositions the first and third are in parallel, while the second is crosswise.

According to another embodiment of the invention of the sequence of three 180°-transpositions the first and third done individually inside the single Roebel bars, while the second crosses the intermediate stack of cooling tubes crosswise.

In a further embodiment, the end windings can be transposed as well; in this case individual transposition each end winding can be 90 or 180° (but transposition can also differ from these angles). In addition, the transposition at the end windings can be in the same direction or in opposite direction compared to the transposition at the slot part of the Roebel bar. Preferably, this transposition is provided only when strands are alternatively transposed up and down the stacks.

BRIEF DESCRIPTION OF THE DRAWINGS

The present invention is now to be explained more closely by means of different embodiments and with reference to the attached drawings.

FIG. 1 shows the cross section through a slot with double bars consisting of two Roebel bars and a single stack of cooling tubes between them;

FIG. 2 shows a top view on a bar with internal transpositions of the single bars being visible with no crossing of the cooling tube stack;

FIG. 3 shows a normal double massive lug at bar ends (FIG. 3a) and a crossing double lug in the middle of the phase group (FIG. 3b);

FIG. 7-9 show stator coils with double bars (3 strands per column), double lugs and crossover bars according to three different embodiments of the invention.

DETAILED DESCRIPTION

The invention deals with Roebel bar windings as discussed before. At bar ends one massive lug per single bar is put, in total again two lugs per bar end (see FIG. 3a). In the middle of the phase a cross-over bar is put or several cross-over bars are put instead of a crossing lug according to FIG. 3b, to compensate for the stray field voltages.

The strands of the cross-over bars are transposed over the cooling tube stack (16) in the middle (FIG. 1) in order to change the sides of the single bars 17, 18 along the active part.

Figures 4, 5:
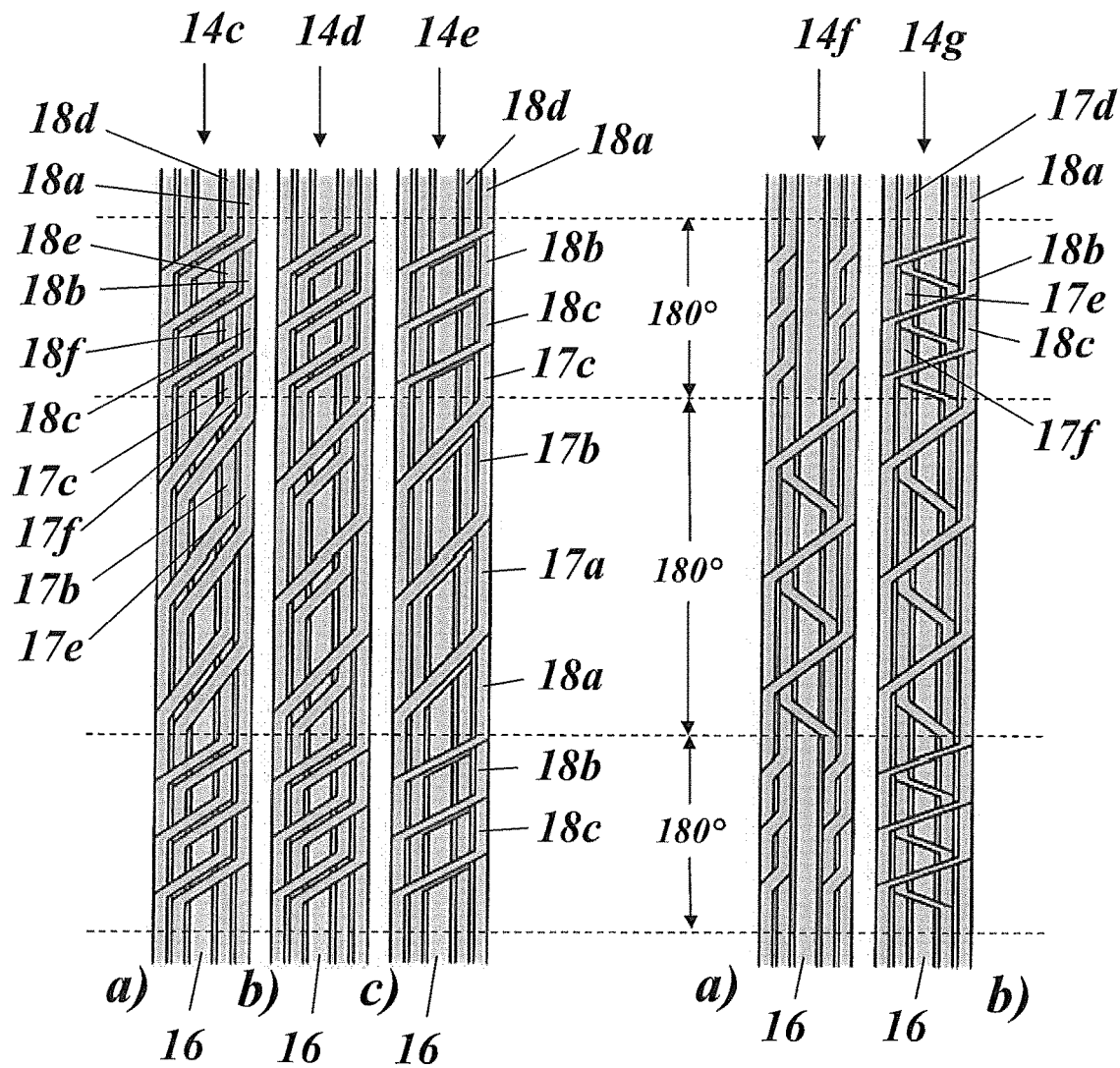
FIG. 4 shows in a top view three different transpositions of directly cooled double Roebel bars with a 540° Roebelisation and all transpositions in parallel (FIG. 4a), or a 540° Roebelisation with outer 180°-transpositions in parallel and the inner 180°-transposition crosswise (FIG. 4b), or a 540° Roebelisation with all transpositions crosswise (FIG. 4c)
FIG. 5 shows in a top view two different transpositions of directly cooled double Roebel bars with outer parts done individually inside the single bars and the inner 180° part being transposed crosswise (FIG. 5a), and a 540°-Roebelisation with all transpositions done crosswise (FIG. 5b)

According to the invention different types of cross-over bars can replace the crossing lugs 20a,b according to FIG. 3b. The most simple cross-over bar is the parallel transposed bar as shown in FIG. 4a, where all transpositions of a 540° Roebelisation are all in parallel. Other solutions according to the invention are shown in FIG. 4b, where the outer 180° transpositions are in parallel, while the inner 180° transposition is crosswise, and in FIG. 4c, where all transpositions of the 540° Roebelisation are crosswise. In all bars 14c, 14d and 14e shown in FIG. 4 two neighbouring stacks are transposed either up-the-stack or down-the-stack.

In any case, a slot with double bars is used consisting of two Roebel bars, which are transposed together over the central cooling tube stack. From both stacks the uppermost respectively the lowermost strands are transposed together, either in a parallel way or crosswise. The total Roebelisation angle in the active part is 540°. All transpositions have to cross the cooling tube stack either in parallel or crosswise, whereby the crosswise transposition is only in the middle 180°-section (FIG. 4b) or for the full 540° (FIG. 4c).

It is as well possible to apply cross-over bars with having stacks which are transposed alternatively up-the-stack, then down-the-stack and again up-the-stack and down-the-stack. The crossing of the cooling tube stack is more complicated because the left most stack of strands goes to the right most one and the second right one goes to the second left one. The crossing of the cooling tube stack can be done in the middle 180° only and the outer parts are transposed individually inside the single Roebel bars (of any Roebelisation angle, see FIG. 5a), or it may be applied to all active part transpositions if the Roebelisation angle is 540° (see FIG. 5b).

Figure 6:
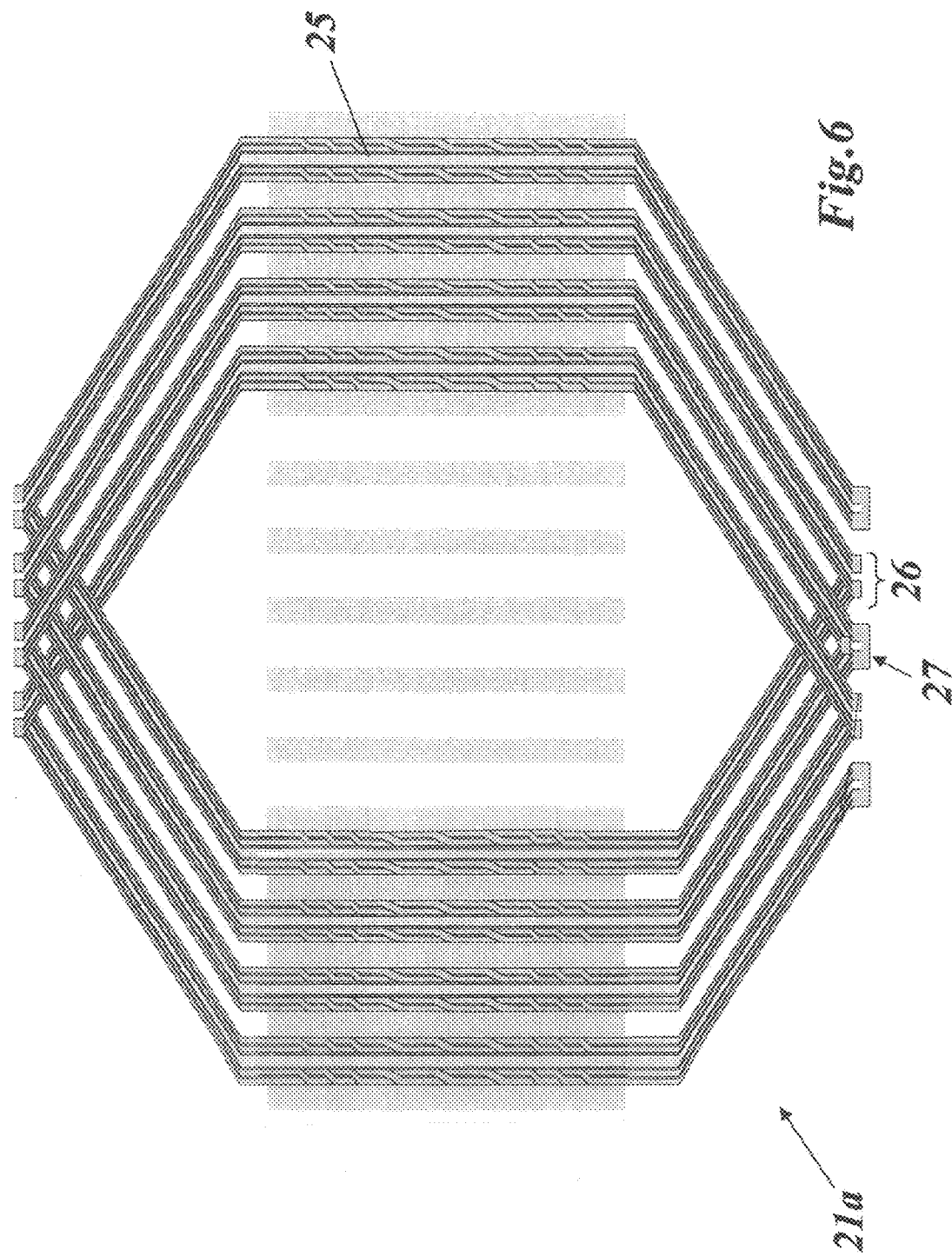
FIG. 6 shows a prior art stator coil with double bars (3 strands per column), double lugs and crossing lugs in the phase middle.
Figure 7:
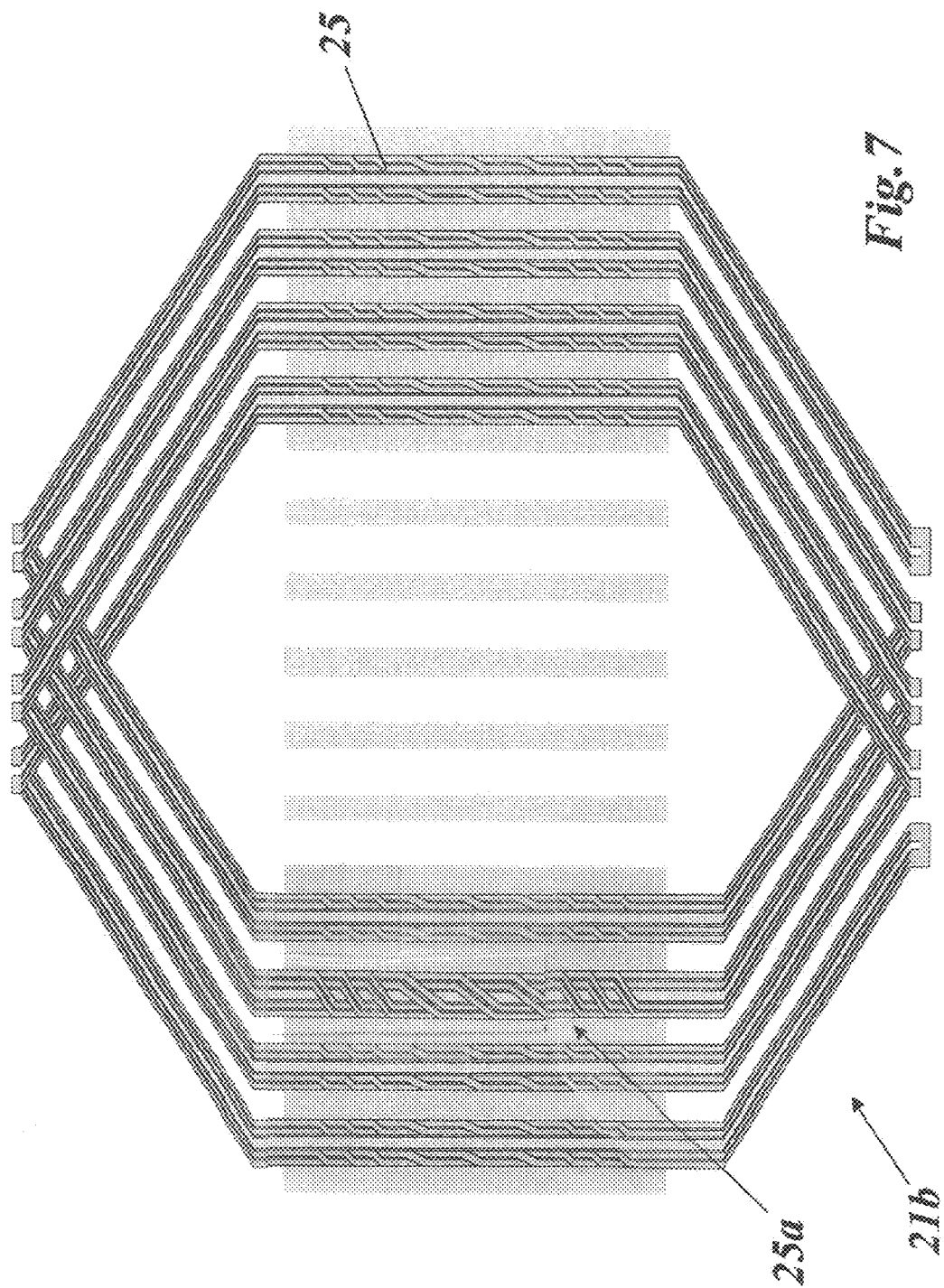

While FIG. 6 shows a prior art stator coil 21a with 24 slots and 2 poles and with double Roebel bars 25 (3 strands per column), double normal lugs 26 and crossing lugs 27 in the phase middle, whereby the left part represents the lower layer and the right part represents the upper layer, FIG. 7 shows in a view similar to FIG. 6 a stator coil 21b according to an embodiment of the invention with a cross-over bar 25a with a completely parallel transposition in the lower layer of the coil.

Figure 8:
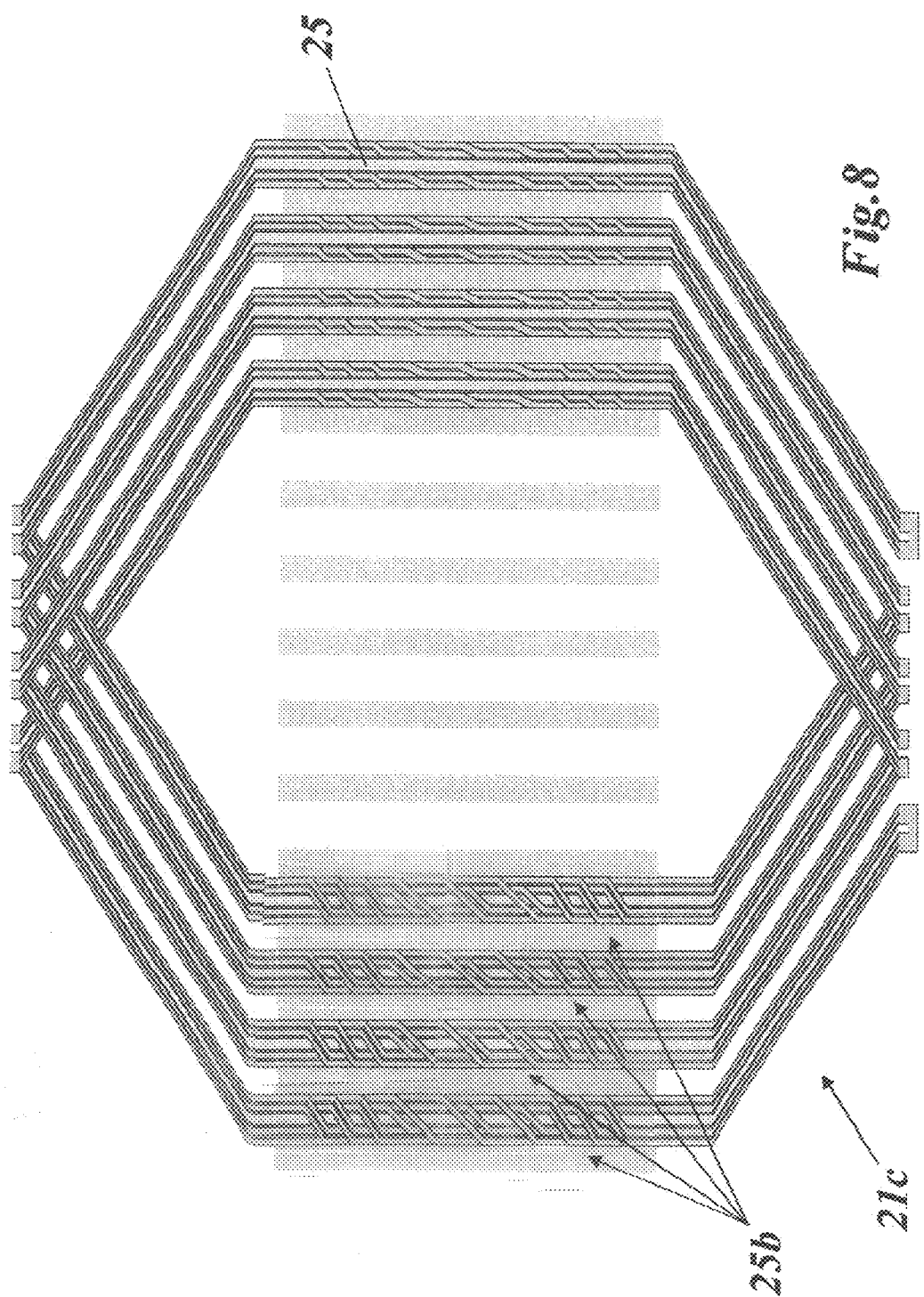

FIG. 8 shows a further embodiment of the invention, i.e. a stator coil 21c with cross-transposed cross-over bars 25b in the lower layer of the coil.

FIG. 9 finally shows another embodiment of the invention, i.e. a stator coil 21d with a cross-over bar 25c made as an inner 540° cross transposed bar, in the lower layer of the coil.

The end windings can be transposed as well. Preferably an individual transposition of each end winding is 90 or 180°; this transposition is only provided when the strands are alternatively transposed up and down the stacks, as for example shown in FIGS. 2 and 5.

Naturally the features described may be independently provided from one another.

The invention claimed is:

1. A stator winding of a directly cooled electric machine, comprising:
   directly gas cooled double Roebel bars arranged as active parts in slots of a stator body, with each double Roebel bar consisting of two single Roebel bars, separated by a single intermediate cooling tube stack between the double Roebel bars;
   each single Roebel bar of the double Roebel bars comprising a stack of a plurality of transposed individual strands; and
   at least one double Roebel bar constructed as a cross-over bar with individual strands transposed over the single intermediate cooling tube stack to change the individual strands from one single Roebel bar of the double Roebel bar to another single Roebel bar of another double Roebel bar on an opposite side of the single intermediate cooling tube stack of the active part for compensation of stray field voltages.

2. The stator winding according to claim 1, further comprising a plurality of cross-over bars.

3. The stator winding according to claim 1, wherein at the cross-over bar an uppermost individual strand and a lowermost individual strand, respectively, of the stack of the plurality of transposed individual strands are transposed together.

4. The stator winding according to claim 3, wherein a total Roebelisation angle in the active part of the cross-over bar is 540°.

5. The stator winding according to claim 4, wherein the total Roebelisation angle is achieved by a sequence of three transpositions of 180° each.

6. The stator winding according to claim 5, wherein all transpositions cross the single intermediate cooling tube stack either in parallel and/or crosswise.

7. The stator winding according to claim 6, wherein all transpositions cross the single intermediate cooling tube stack in parallel.

8. The stator winding according to claim 6, wherein all transpositions cross the single intermediate cooling tube stack crosswise.

9. The stator winding according to claim 6, wherein in the sequence of three 180° transpositions, the first and third transpositions are in parallel, while the second transposition is crosswise.

10. The stator winding according to claim 5, wherein in the sequence of three 180° transpositions, the first and third transpositions are done individually inside the single Roebel bars, while the second transposition crosses the single intermediate cooling tube stack crosswise.

11. The stator winding according to claim 1, wherein end windings are transposed.

12. The stator winding according to claim 11, wherein each end winding is transposed by 90° or 180°.

* * * * *